(12) United States Patent
Krenz et al.

(10) Patent No.: US 12,330,806 B2
(45) Date of Patent: Jun. 17, 2025

(54) LANDING ZONE DESIGNATORS

(71) Applicant: Rockwell Collins, Inc., Cedar Rapids, IA (US)

(72) Inventors: Michael J. Krenz, Roscoe, IL (US); Stephen Tongue, Hampden, MA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 597 days.

(21) Appl. No.: 17/577,268

(22) Filed: Jan. 17, 2022

(65) Prior Publication Data

US 2023/0227177 A1 Jul. 20, 2023

(51) Int. Cl.
*H01Q 3/04* (2006.01)
*B64D 45/04* (2006.01)
*H01Q 25/00* (2006.01)

(52) U.S. Cl.
CPC .............. *B64D 45/04* (2013.01); *H01Q 3/04* (2013.01); *H01Q 25/001* (2013.01)

(58) Field of Classification Search
CPC ...... H01Q 25/001; H01Q 25/00; H01Q 21/24; H01Q 3/04; B64D 45/04; B64F 1/007; B64F 1/36; G01S 13/913
See application file for complete search history.

(56) References Cited

U.S. PATENT DOCUMENTS

| | | | |
|---|---|---|---|
| 3,195,135 A | 7/1965 | Leo | |
| 5,045,859 A | 9/1991 | Yetter | |
| 8,949,011 B2 | 2/2015 | Ford et al. | |
| 9,387,940 B2 | 7/2016 | Godzdanker et al. | |
| 10,890,926 B2* | 1/2021 | McNair | G05D 1/102 |
| 10,946,982 B2 | 3/2021 | Carthew et al. | |
| 2016/0068264 A1* | 3/2016 | Ganesh | G06Q 30/0641 701/4 |
| 2018/0053139 A1* | 2/2018 | Stoman | B64U 10/13 |
| 2018/0357910 A1* | 12/2018 | Hobbs | G01S 1/08 |
| 2019/0339720 A1* | 11/2019 | Petersen | G08G 5/02 |
| 2020/0310467 A1 | 10/2020 | Birkedahl et al. | |
| 2021/0349456 A1* | 11/2021 | Pham | G05D 1/0676 |
| 2022/0198947 A1* | 6/2022 | Shibata | G08G 5/0069 |

FOREIGN PATENT DOCUMENTS

| | | |
|---|---|---|
| CN | 208088152 U | 11/2018 |
| CN | 109436359 A | 3/2019 |
| CN | 109440664 A | 3/2019 |
| CN | 109941452 A | 6/2019 |

(Continued)

OTHER PUBLICATIONS

KR-20190137398-A translation (Year: 2019).*

(Continued)

*Primary Examiner* — Matthew M Barker
(74) *Attorney, Agent, or Firm* — Suiter Swantz IP

(57) ABSTRACT

A landing zone designator system includes two sets of antennas; the first set of antennas defines a first vertical lobe at a first known orientation to the landing pad and the second set of antennas defines a second vertical lobe at a second known orientation to the landing pad. A VTOL aircraft including two antennas tracks the vertical lobes to align the aircraft to the center of the landing pad. The aircraft antennas can be rotated or repositioned dynamically to accommodate the orientation of the aircraft.

8 Claims, 5 Drawing Sheets

(56) References Cited

FOREIGN PATENT DOCUMENTS

DE 102019219972 A1 6/2021
KR 20190137398 A * 12/2019

OTHER PUBLICATIONS

Perez, Ricardo. "Antenna Polarization Measurements" Apr. 6, 2003. Accessed online Nov. 16, 2024 <https://interferencetechnology.com/antenna-polarization-measurements/> (Year: 2003).*
Clary, G. R. et al., "Development and flight test of an X-band precision approach concept for remote-area rotorcraft operations", NASA Technical Memorandum 84398, Retrieved from the Internet https://ntrs.nasa.gov/api/citations/19840001974/downloads/19840001974.pdf.

* cited by examiner

LANDING ZONE DESIGNATORS

BACKGROUND

Urban air mobility vehicles require advanced navigation and guidance at designated landing areas for vertical takeoff and landing (VTOL) vehicles, also called vertiports. Takeoff and landing without a pilot on board is especially challenging; existing guidance to touchdown is not sufficiently precise. Furthermore, guidance must be present even in the absence of global navigation satellite systems (GNSS) which are often obscured in an urban environment.

SUMMARY

In one aspect, embodiments of the inventive concepts disclosed herein are directed to a landing zone designator system having two sets of antennas. The first set of antennas defines a first vertical lobe at a first known orientation to the landing pad and the second set of antennas defines a second vertical lobe at a second known orientation to the landing pad. A VTOL aircraft including two antennas tracks the vertical lobes to align the aircraft to the center of the landing pad.

In a further aspect, the aircraft antennas can be rotated or repositioned dynamically to accommodate the orientation of the aircraft.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
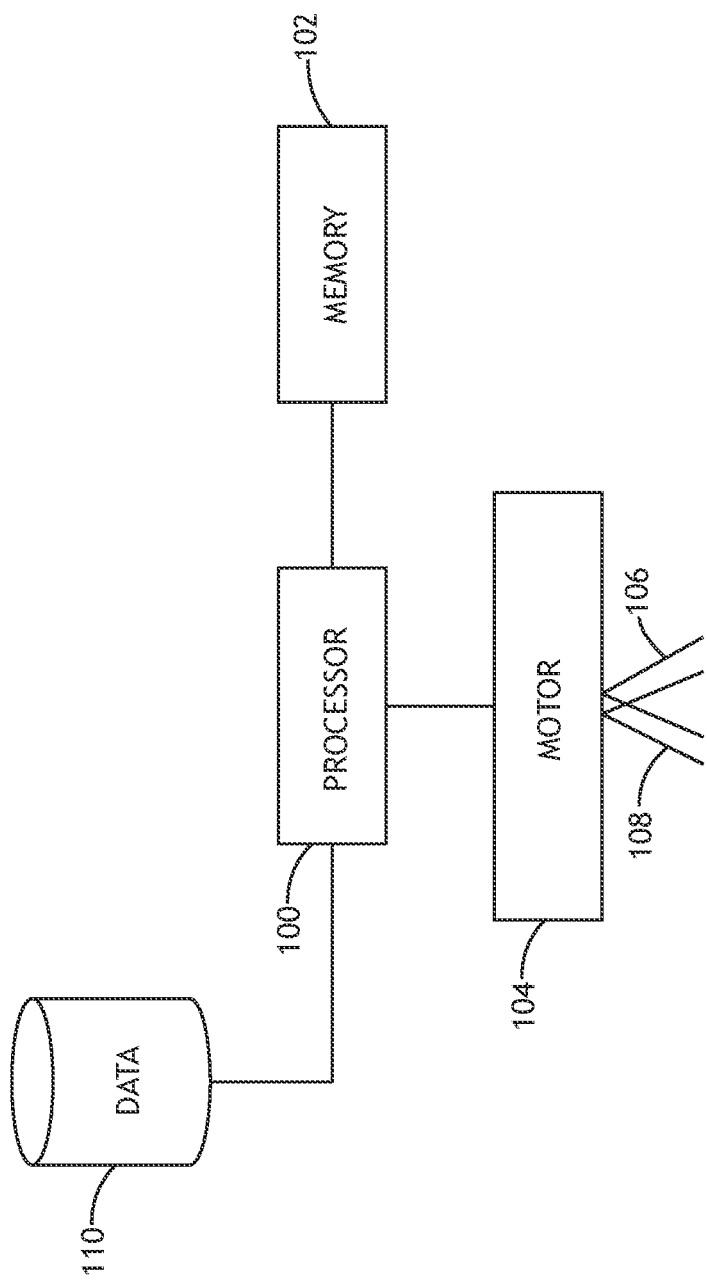
FIG. 1 shows a block diagram of a system utilizing landing zone designators according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a landing zone designator system having two sets of antennas. The first set of antennas defines a first vertical lobe at a first known orientation to the landing pad and the second set of antennas defines a second vertical lobe at a second known orientation to the landing pad. A VTOL aircraft including two antennas tracks the vertical lobes to align the aircraft to the center of the landing pad. The aircraft antennas can be rotated or repositioned dynamically to accommodate the orientation of the aircraft.

Referring to FIG. 1, a block diagram of a system utilizing landing zone designators according to an exemplary embodiment is shown. The system includes a processor 100, memory 102 connected to the processor 100 for embodying processor executable code, and two antennas 106, 108 connected to the processor 100 for receiving ground-based signals. A first antenna 106 is configured to receive a first ground-based signal and a second antenna 108 is configured to receive a second ground-based signal. In at least one embodiment, the antennas 106, 108 are oriented substantially orthogonal to each other.

The processor 100 is configured monitor signal strength from the antennas 106, 108 and determine when signals are locally maximized. The processor 100 may determine necessary translations to the system (adjustments to the position of the system) to maintain the antennas 106, 108 at positions where signal strength is maximized as the aircraft including the system descends to a landing pad (or alternatively ascends from a landing pad).

In at least one embodiment, the antennas 106, 108 are mounted to a rotatable plate or other adjustable apparatus 104. The processor 100 may alter the orientation of the antennas 106, 108 with respect to the aircraft by rotating the apparatus 104 via a motor or similar device. It may be advantageous to adjust the orientation of the aircraft with respect to wind or other environmental features, but maintain the antennas 106, 108 in a different relative orientation with respect to the landing pad. For example, changing wind directions may mean it is advantageous to keep the aircraft pointed into the wind, while at the same time keeping the antennas 106, 108 orientated to the ground-based vertical lobes.

In at least one embodiment, each antenna 106, 108 comprises a "V" shaped antenna 106, 108 mounted orthogonally on the belly of the aircraft with opposing blades/fins/poles connected to the same receiver. One receiver is used for each pair; receivers may be physically separate or logically separate if multiplexed. Each "V" of the antenna array will align with one ground-based vertical lobe. In at least one embodiment, the "V" shaped antennas 106, 108 may be disposed at the same location; alternatively, the antennas 106, 108 may be offset by some linear distance as long as they are orthogonally oriented.

Figure 2:
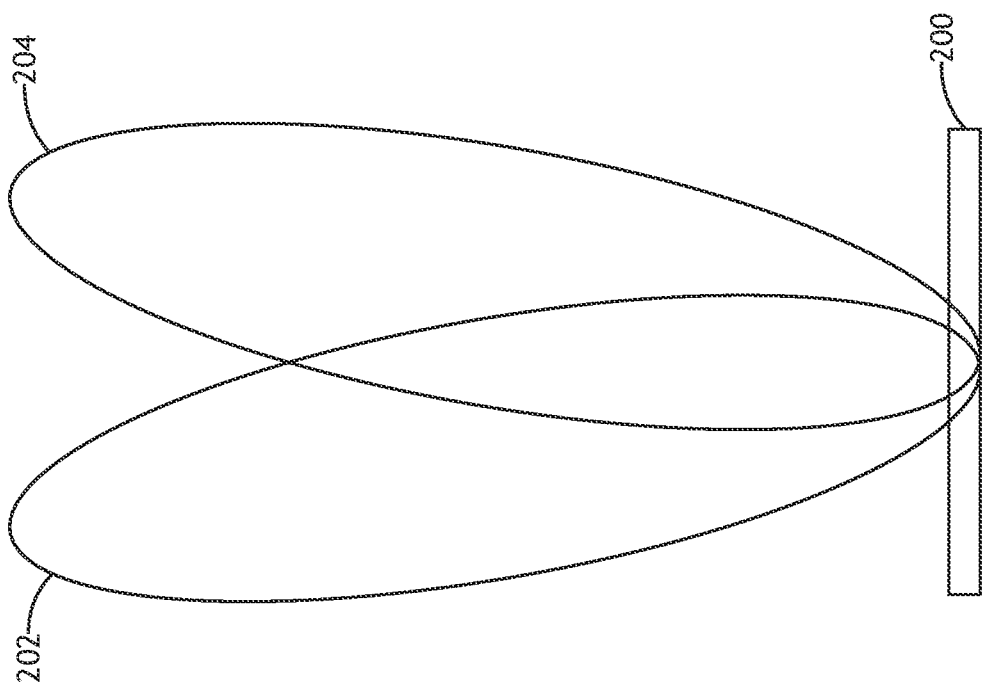
FIG. 2 shows vertical lobes for landing zone designators according to an exemplary embodiment.

Referring to FIG. 2, vertical lobes 202, 204 for landing zone designators according to an exemplary embodiment are shown. A vertical landing pad 200 includes antennas disposed orthogonally to produce vertical lobes 202, 204. In at least one embodiment, a Localizer antenna array emits the two vertical lobes 202, 204 aimed vertically on a common carrier frequency. In at least one embodiment, a first vertical lobe 202 is at 90 Hz and a second vertical lobe 204 is at 150 Hz. The point where the vertical lobes intersect with equal signal strength is calibrated to follow a vertical centerline orthogonal to the center point of the landing pad 200. A receiver/processor in the aircraft measures relative signal strength of the two vertical lobes 202, 204 and provides a course deviation indicator.

Figure 3:
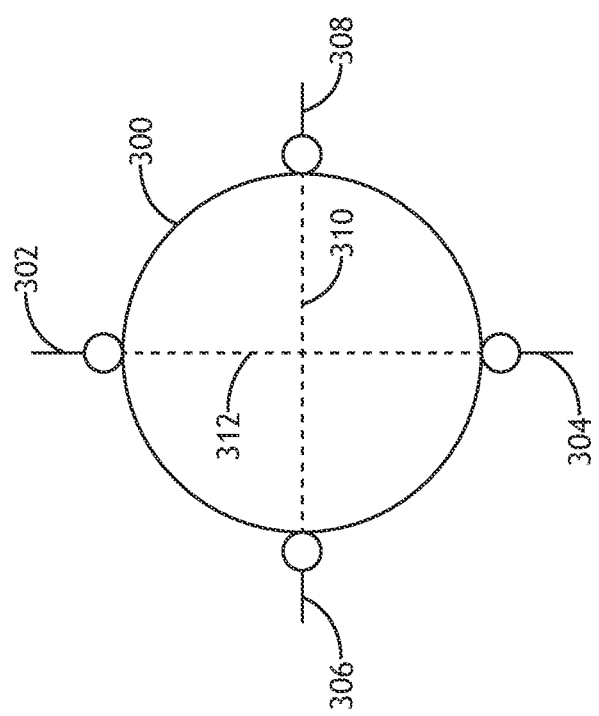
FIG. 3 shows a top view of a landing zone according to an exemplary embodiment.

Referring to FIG. 3, a top view of a landing zone according to an exemplary embodiment is shown. Where a landing pad 300 includes In at least one embodiment, sets of antennas 302, 304, 306, 308 are disposed to create vertical lobes. Each vertical lobe is calibrated to have equal strength along a corresponding chord 310, 312 across the landing pad 300, intersecting at the center. In at least one embodiment, the chords 310, 312 are offset by 90 degrees to provide the best geometry to approach the landing pad 300 from any direction.

Figure 4:
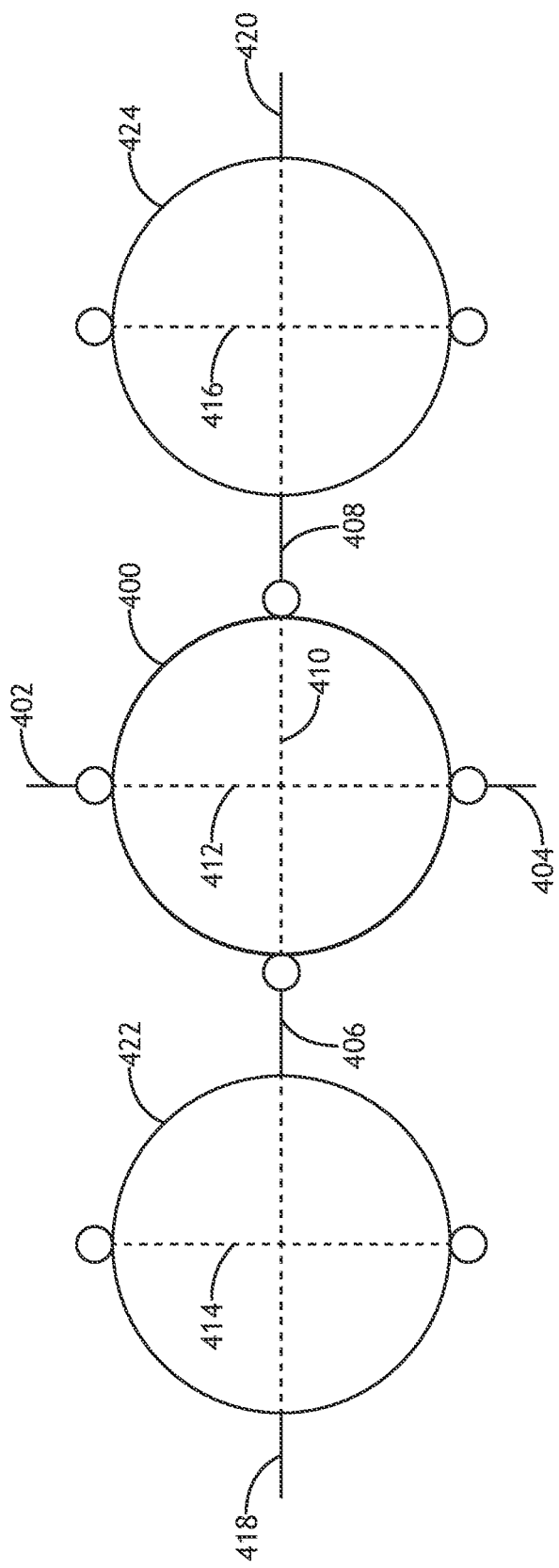
FIG. 4 shows a set of landing zones according to an exemplary embodiment.

Referring to FIG. 4, a set of landing zones according to an exemplary embodiment is shown. In at least one embodiment, a vertiport may include multiple landing pads 400, 422, 424.

A first set of antennas 402, 404 is calibrated to have equal strength along a first chord 410 across each of the landing pads 400, 422, 424. Each landing pad 400, 422, 424 includes a second set of antennas 406, 418, 420 that are calibrated to produce vertical lobes having equal signal strength along a second chord 412, 414, 416 corresponding to a unique landing pad 400, 422, 424.

A landing system may identify which landing pad 406, 422, 424 is being utilized and activating only the appropriate antennas in the second set of antennas 406, 418, 420 to produce a vertical lobe corresponding to the appropriate chord 412, 424, 426 such that the first chord 410 and appropriate second chord 412, 414, 416 intersect at the center of the appropriate landing pad 400, 422, 424. In at least one embodiment, the first chord 410 is offset by 90 degrees from each of the second chords 412, 414, 416 to provide the best geometry to approach the landing pad 400, 422, 424 from any direction. Signal strength for each vertical lobe may be varied according to the landing pad 400, 422, 424 being used.

Figure 5:
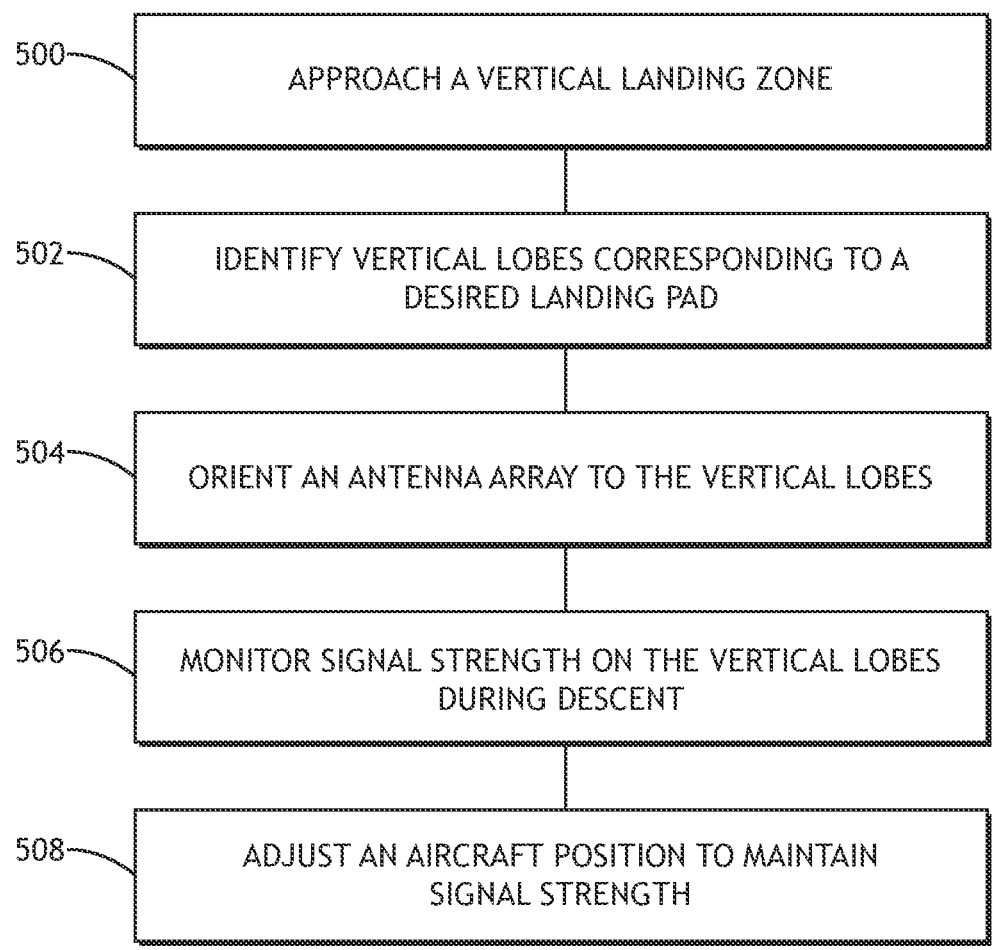
FIG. 5 shows a flowchart of a method for landing an aircraft according to an exemplary embodiment.

Referring to FIG. 5, a flowchart of a method for landing an aircraft according to an exemplary embodiment is shown. As a VTOL aircraft approaches 500 a landing zone at a safe enroute altitude, the aircraft approaches reception range of corresponding vertical lobe transmitters. The aircraft identifies 502 the vertical lobes via an antenna array on the aircraft with receivers disposed orthogonally. The vertical lobes may include specific identifiers for the corresponding landing pad. The antenna array is oriented 504 to align with the vertical lobes. Orientation 504 may by mechanical adjustment; alternatively, or in addition, the antennas may comprise an electronically scanned array (ESA). One or more ESA antennas may be configured via electronic signals to adjust the phase of ESA elements and thereby adjust the orientation of the array.

The orientation of the antenna array may be continuously maintained separate from the orientation of the aircraft. The aircraft continuously monitors 506 signal strength of the vertical lobes and adjusts 508 the position of the aircraft to maintain signal strength and thereby keep the aircraft substantially centered over the landing pad.

In at least one embodiment, position adjustments may comprise deviation indicators that a pilot or automatic avionics system may use to manipulate control surfaces and thereby move indicators toward the center of corresponding instruments. When indicators are centered, the aircraft is positioned directly above the center of the landing pad. The aircraft can then execute a vertical descent to landing using a radio altimeter, LiDAR, or barometric altitude to measure height above the touchdown point.

Embodiments of the present disclosure significantly reduce the risk associated with vertical landing, and utilize know indicator technology.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An aircraft landing system comprising:
   a landing zone comprising:
      a landing pad;
      a first set of landing antennas; and
      a second set of landing antennas; and
   an onboard receiver comprising:

a first antenna;
a second antenna;
a motor configured to rotate an antenna assembly including the first antenna and second antenna; and
at least one processor in data communication with a memory storing processor executable code for configuring the at least one processor to:
receive a first signal via the first antenna corresponding to a first vertical lobe of a landing pad;
receiving a second signal via the second antenna corresponding to a second vertical lobe of the landing pad; and
continuously monitor a signal strength of the first signal and the second signal,
wherein:
the first set of landing antennas are configured to produce a first vertical lobe having substantially equal signal strength along a first chord defining a first centerline of the landing pad; and
the second set of landing antennas are configured to produce a second vertical lobe having substantially equal signal strength along a second chord defining a second centerline of the landing pad orthogonal to the first centerline.

2. The aircraft landing system of claim 1, wherein the landing pad comprises a first landing pad; further comprising:
at least a second landing pad; and
a third set of landing antennas,
wherein:
the first chord defines a first centerline of the second landing pad; and
the third set of landing antennas are configured to produce a third vertical lobe having substantially equal signal strength along a third chord defining a second centerline of the second landing pad orthogonal to the first centerline.

3. The aircraft landing system of claim 2, wherein each of the second vertical lobe and third vertical lobe encode a unique landing pad identifier.

4. The aircraft landing system of claim 2, wherein each of the second set of landing antennas and the third set of landing antennas are configured to operate exclusively.

5. The aircraft landing system of claim 1, wherein the at least one onboard receiver processor is further configured to identify one or more deviations to maximize the first signal strength and the second signal strength.

6. The aircraft landing system of claim 5, wherein the at least one onboard receiver processor is further configured to apply the one or more deviations to an aircraft control surface.

7. The aircraft landing system of claim 1, wherein the at least one onboard receiver processor is further configured to control a rotation of the antenna assembly, via the motor, independently of the onboard receiver to align the first antenna and the second antenna to the first vertical lobe and the second vertical lobe.

8. The aircraft landing system of claim 1, wherein the first antenna and the second antenna are orthogonal.

* * * * *